(12) United States Patent  
Khial et al.

(10) Patent No.: US 8,862,377 B2
(45) Date of Patent: Oct. 14, 2014

(54) METHOD AND SYSTEM FOR DETECTING FORCES ON AIRCRAFT

(75) Inventors: Karim Khial, Seymour, CT (US); James J. Howlett, North Haven, CT (US); Stuart C. Wright, Woodbridge, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 555 days.

(21) Appl. No.: 13/077,084

(22) Filed: Mar. 31, 2011

(65) Prior Publication Data

US 2012/0253652 A1 Oct. 4, 2012

(51) Int. Cl.
*G06F 19/00* (2011.01)
*B64C 25/00* (2006.01)
*B64D 45/00* (2006.01)

(52) U.S. Cl.
CPC ............... *B64C 25/00* (2013.01); *B64D 45/00* (2013.01); *B64D 2045/008* (2013.01)
USPC ............................................ 701/124; 702/41

(58) Field of Classification Search
USPC .................. 701/124, 10, 4, 14, 15; 702/4, 41; 73/12.04; 244/102 R, 191, 17.13, 76 C, 244/17.11; 340/946, 963
See application file for complete search history.

(56) References Cited

U.S. PATENT DOCUMENTS

| | | |
|---|---|---|
| 3,499,500 A | 3/1970 | Harding |
| 4,638,437 A | 1/1987 | Cleary et al. |
| 4,815,678 A | 3/1989 | Gawne |
| 4,980,835 A | 12/1990 | Lawrence et al. |
| 5,167,385 A | 12/1992 | Hafner |
| 5,446,666 A | 8/1995 | Bauer |
| 5,826,833 A | 10/1998 | Evans et al. |
| 5,927,646 A | 7/1999 | Sandy et al. |
| 6,052,069 A | 4/2000 | Silder, Jr. et al. |
| 6,189,836 B1 | 2/2001 | Gold et al. |
| 6,259,379 B1 | 7/2001 | Paterson et al. |
| 7,093,795 B2 | 8/2006 | Lindahl et al. |
| 7,471,997 B2 | 12/2008 | Tezuka |
| 7,742,846 B2 | 6/2010 | Fanciullo et al. |
| 2004/0078170 A1* | 4/2004 | Di Marzio .................. 702/188 |
| 2008/0114506 A1* | 5/2008 | Davis et al. ..................... 701/16 |
| 2008/0119967 A1* | 5/2008 | Long et al. ....................... 701/3 |
| 2008/0215198 A1* | 9/2008 | Richards ......................... 701/15 |
| 2010/0288878 A1* | 11/2010 | Bennett ................... 244/104 FP |
| 2011/0203391 A1* | 8/2011 | Knoop et al. ............ 73/862.381 |
| 2012/0095802 A1* | 4/2012 | Wilberding et al. ......... 705/7.28 |

* cited by examiner

*Primary Examiner* — Marthe Marc-Coleman
(74) *Attorney, Agent, or Firm* — Cantor Colburn LLP

(57) ABSTRACT

A system for sensing a force applied to an aircraft includes a first sensor, a second sensor, and a processor operative to define a first velocity vector as a function of a first velocity due to a rotation motion of the aircraft, define a second velocity vector as a function of a second velocity due to the rotation motion of the aircraft, define an instant axis of rotation of the aircraft as a function of the first velocity vector and the second velocity vector, determine whether a force has been exerted on a first portion of the aircraft, and output an indication that a force has been exerted on the first portion of the aircraft responsive to determining that the force has been exerted on the first portion of the aircraft.

16 Claims, 5 Drawing Sheets

METHOD AND SYSTEM FOR DETECTING FORCES ON AIRCRAFT

BACKGROUND OF THE INVENTION

The subject matter disclosed herein relates to detecting impact forces on aircraft, and in particular to detecting landing gear impact on aircraft.

Aircraft such as, for example, rotary wing aircraft and fixed wing aircraft use a variety of sensors to provide feedback to aircraft control systems. Detecting when a force, such as weight, is applied to the landing assemblies or other portions of an aircraft provides useful feedback to aircraft systems. Previous systems used sensors located on each landing assembly to determine whether weight was applied to a landing assembly. The use of these sensors increased the weight and complexity of the aircraft, and had limited fidelity in sensing actual weight applied to a landing assembly.

BRIEF DESCRIPTION OF THE INVENTION

According to one aspect of the invention, a method for sensing a force applied to an aircraft includes defining a first velocity vector as a function of a first velocity due to a rotation motion of the aircraft, defining a second velocity vector as a function of a second velocity due to the rotation motion of the aircraft, defining an instant axis of rotation of the aircraft as a function of the first velocity vector and the second velocity vector, determining whether a force has been exerted on a first portion of the aircraft, and outputting an indication that a force has been exerted on the first portion of the aircraft responsive to determining that the force has been exerted on the first portion of the aircraft.

According to another aspect of the invention, a system for sensing a force applied to an aircraft includes a first sensor, a second sensor, and a processor operative to define a first velocity vector as a function of a first velocity due to a rotation motion of the aircraft, define a second velocity vector as a function of a second velocity due to the rotation motion of the aircraft, define an instant axis of rotation of the aircraft as a function of the first velocity vector and the second velocity vector, determine whether a force has been exerted on a first portion of the aircraft, and output an indication that a force has been exerted on the first portion of the aircraft responsive to determining that the force has been exerted on the first portion of the aircraft.

These and other advantages and features will become more apparent from the following description taken in conjunction with the drawings.

BRIEF DESCRIPTION OF THE DRAWING

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
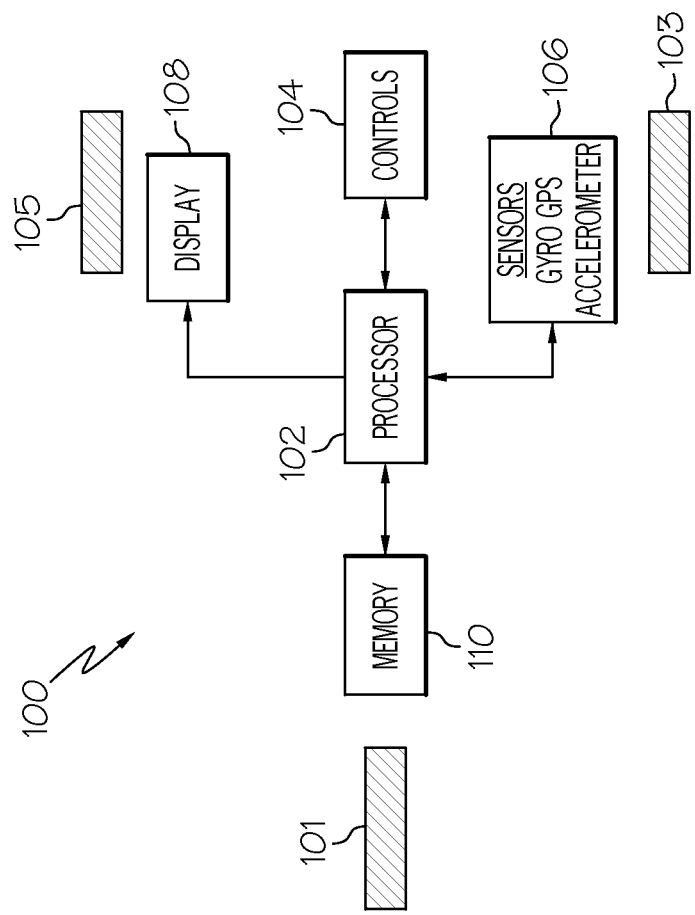
FIG. 1 illustrates a block diagram of an exemplary embodiment of an aircraft 100.

FIG. 1 illustrates a block diagram of an exemplary embodiment of an aircraft 100. The aircraft 100 includes a nose landing assembly 101, a left landing assembly 103, and a right landing assembly 105. The landing assemblies may include, for example, a landing gear assembly that includes an inflatable wheel, or any other device that is operative to contact a landing surface. For example a skid assembly may be used, and portions of the skid assembly may be designated as contact points similar to the gear described above. The aircraft 100 includes a processor 102 that is communicatively connected to flight controls 104 and sensors 106 that may include, for example, a gyro sensor, one or more accelerometers, two or more velocity sensors from, for example, a global positioning system (GPS), or any other inertial sensors. The processor 102 may also be communicatively connected to a memory 110 and a display 108.

Figure 2:
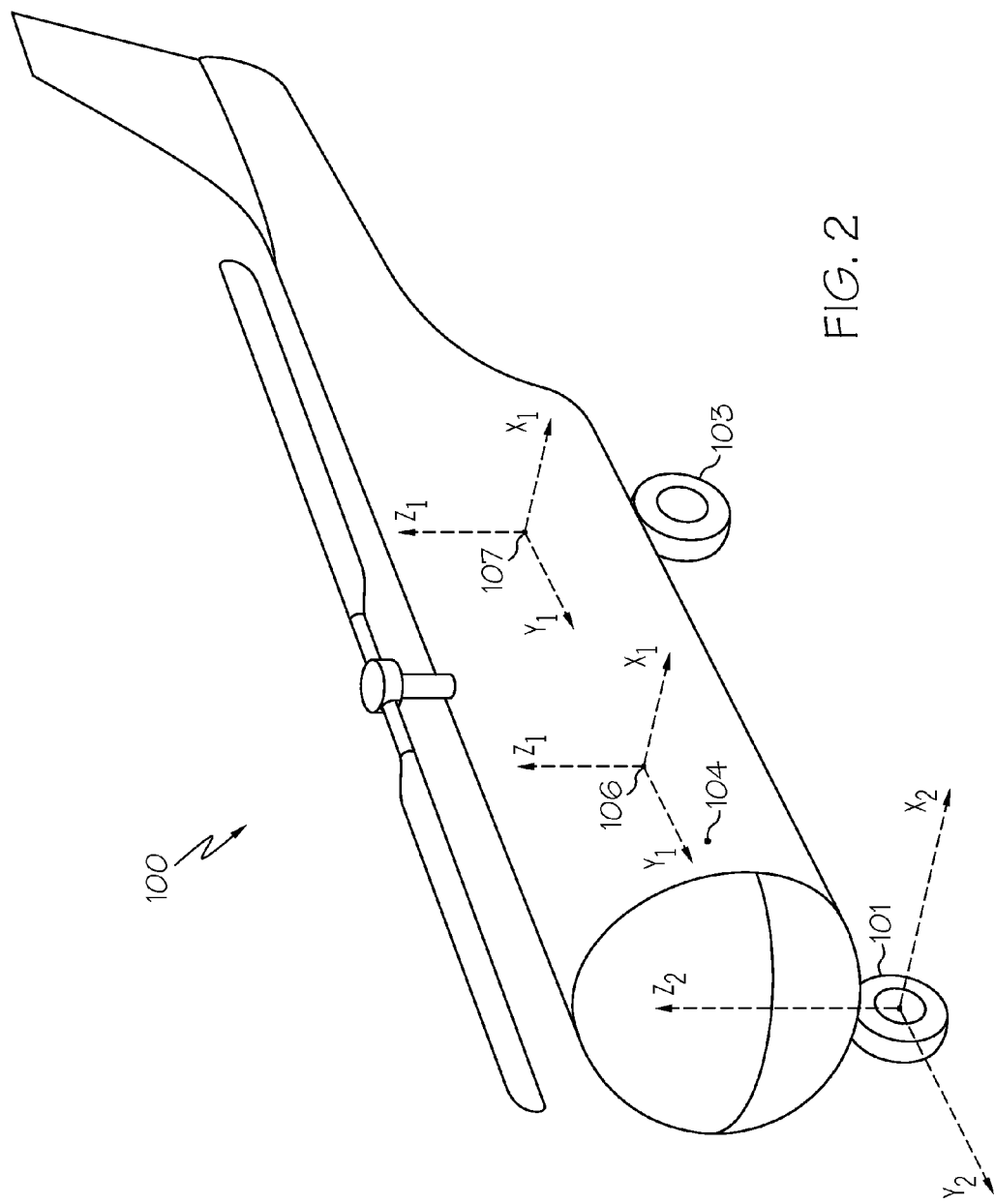
FIG. 2 illustrates an example of the geometric relationship between sensors and a nose landing assembly of FIG. 1.

FIG. 2 illustrates an example of the geometric relationship between a sensor 106, sensor 107 and the nose landing assembly 101 including an example of coordinate systems that are associated with the sensor 106, the sensor 107 and the nose landing assembly 101.

Figure 3:
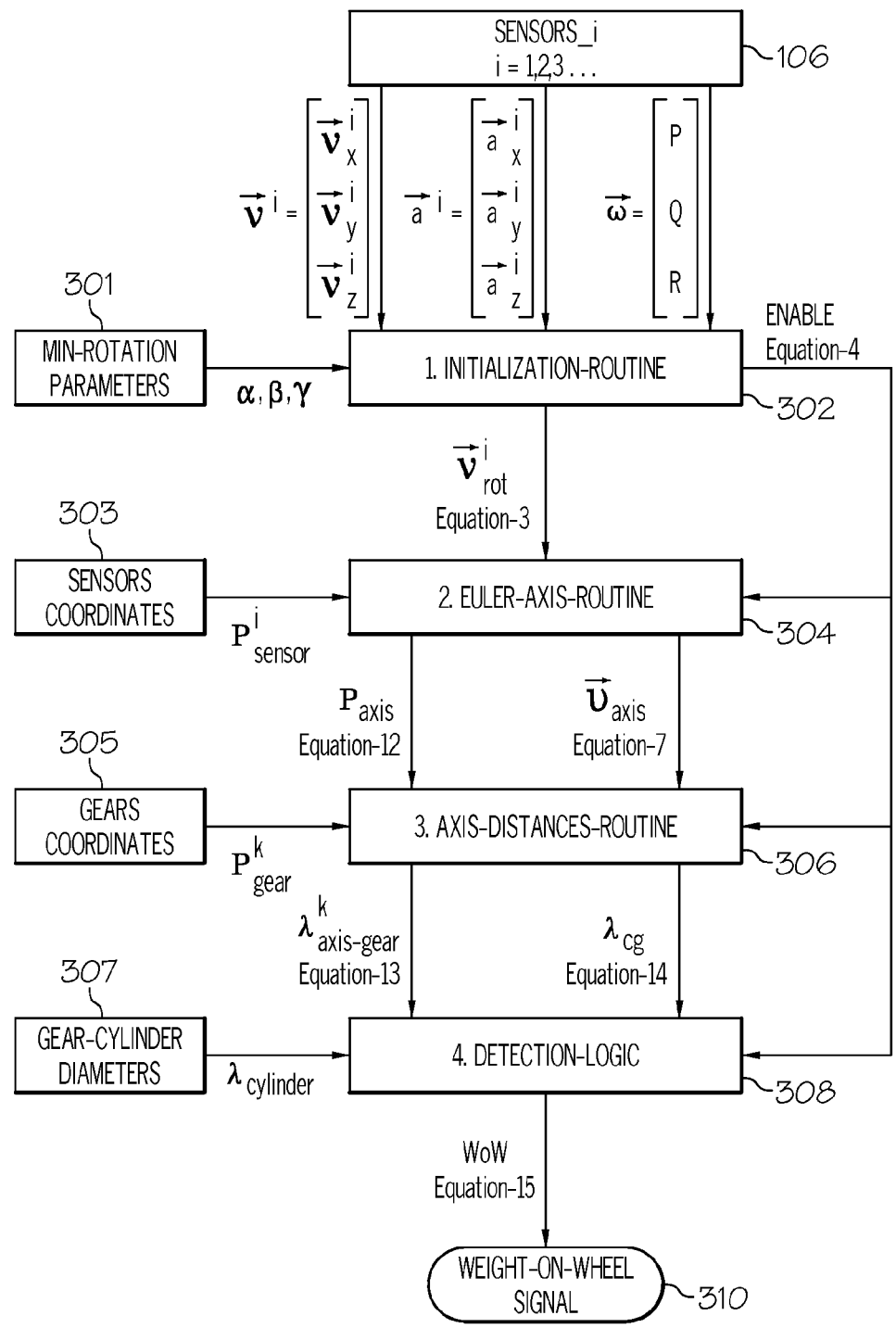
FIG. 3 illustrates a block diagram of an exemplary embodiment of logic performed by the processor of FIG. 1.

FIG. 3 illustrates a block diagram of an exemplary embodiment of logic performed by the processor 102 (of FIG. 1). In this regard, the processor 102 receives input data from the sensors (sensors_i; where i=1, 2, 3, . . . ) 106. The input includes acceleration ($a^i_x$, $a^i_y$, and $a^i_z$) from, for example, an accelerometer, velocity ($v^i_x$, $v^i_y$, $v^i_z$) from, for example, a GPS or derived from an accelerometer, and a rate of change in orientation (P, Q, R) from, for example, a gyro. In block 302, the processor 102 performs an initialization routine that receives minimum rotation parameters ($\alpha$, $\beta$, $\gamma$) 301 where $\alpha$ is the minimum angular velocity norm threshold value, $\beta$ is the minimum angular velocity derivative norm threshold value and $\gamma$ is the minimum acceleration norm threshold value, and determines whether a minimum rotation norm (MRN) condition has been satisfied as follows:

$$\mathrm{MRN} := \{(|\vec{\omega}|>\alpha) \& (|\vec{\dot{\omega}}|>\beta)\} \quad (1)$$

The processor 102 resets the aircraft velocities and accelerations values as follows:

$$\text{At: } t=t_1 \text{ where } \{MRN \text{ is true}\}, \text{ then: } \begin{cases} \vec{v}^i_{trans} = \vec{v}^i(t_1) \\ \& \\ \vec{a}^i_{trans} = \vec{a}^i(t_1) \end{cases} \quad (2)$$

Thereafter the initialization routine outputs velocities and accelerations due to the rotation motion of the aircraft only ($\vec{v}^i_{rot}$ and $\vec{v}^i_{rot}$) where:

$$\text{For: } t>t_1 \text{ where } \{MRN \text{ is true}\}, \text{ then: } \begin{cases} \vec{v}^i_{rot} = \vec{v}^i - \vec{v}^i_{trans} \\ \& \\ \vec{a}^i_{rot} = \vec{a}^i - \vec{a}^i_{trans} \end{cases} \quad (3)$$

The initialization routine determines whether the acceleration norm due to the rotation motion of the aircraft exceed the acceleration norm threshold value ($\gamma$) to output an enabling signal (Enable) to enable the landing detection process, as follows:

$$\text{if } \{(\text{MRN is true}) \& (\vec{\alpha}_{rot}^i > \gamma)\}, \text{ then: Enable}=1 \quad (4)$$

Figure 4:
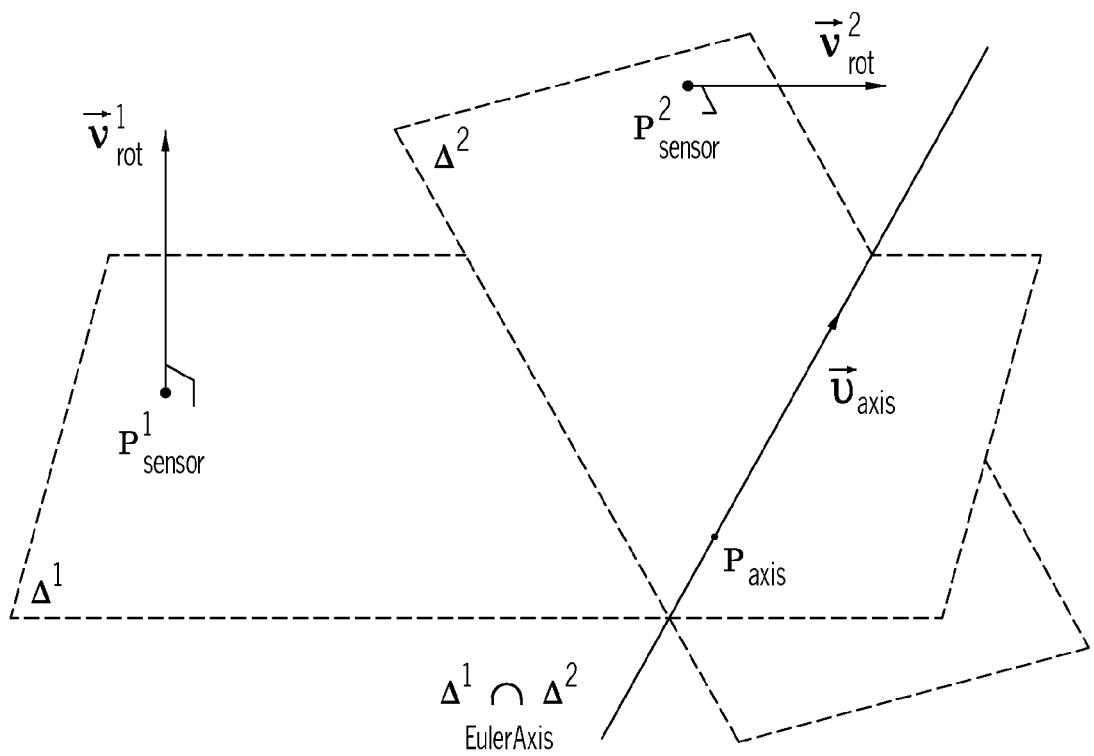
FIG. 4 illustrates an exemplary diagram of a Euler Axis estimation.

In block 304 the processor 102 receives sensor coordinates ($P^i_{sensor}$) 303, which includes locations of the sensors, and performs Euler-Axis routine that determines an instant axis of rotation of the aircraft defined as the intersection line of two non-parallel planes as illustrated in FIG. 4. Geometrically, the intersection line, axis of rotation, is defined by a unit directional vector $\vec{u}_{axis}$ and a specific point defined $P_{axis}$ on the axis. The parametric equation of the axis of rotation is given by:

$$P_{axis}(s) = P_{axis} + \vec{u}_{axis} \cdot s \quad (5)$$

In a three dimensional space, plane $\Delta$ is defined by a point P and a normal vector $\vec{n}$. Two planes $\Delta^1$ and $\Delta^2$ are not parallel if their normal vectors $\vec{n}^1$ and $\vec{n}^2$ are not parallel; this is equivalent to the cross product norm condition (CPN), where CPN=$|\vec{n}^1 \times \vec{n}^2| \geq \mu >> 0$. To determine the axis of rotation directional unit vector $\vec{u}_{axis}$; the best two non parallel velocity vectors are selected by maximizing CPN, where:

$$\text{CPN}=\max\{|\vec{v}_{rot}^1 \times \vec{v}_{rot}^2|, |\vec{v}_{rot}^1 \times \vec{v}_{rot}^3|, |\vec{v}_{rot}^2 \times \vec{v}_{rot}^3|\} \quad (6)$$

In vector space, the axis of rotation directional unit vector is given by:

$$\vec{u}_{axis} = \begin{cases} \dfrac{\vec{v}_{rot}^1 \times \vec{v}_{rot}^2}{|\vec{v}_{rot}^1 \times \vec{v}_{rot}^2|}, & \text{if } CPN = |\vec{v}_{rot}^1 \times \vec{v}_{rot}^2| \\ \dfrac{\vec{v}_{rot}^1 \times \vec{v}_{rot}^3}{|\vec{v}_{rot}^1 \times \vec{v}_{rot}^3|}, & \text{if } CPN = |\vec{v}_{rot}^1 \times \vec{v}_{rot}^3| \\ \dfrac{\vec{v}_{rot}^2 \times \vec{v}_{rot}^3}{|\vec{v}_{rot}^2 \times \vec{v}_{rot}^3|}, & \text{if } CPN = |\vec{v}_{rot}^2 \times \vec{v}_{rot}^3| \end{cases} \quad (7)$$

To simplify the example, CPN=$|\vec{v}_{rot}^1 \times \vec{v}_{rot}^2|$, thus selecting sensor_1 and sensor_2 for the detection process.

To determine the intersection line, axis of rotation, a specific point is found on the line, that is, to find a point $P_{axis}$ that lies in both planes $\Delta^1$ and $\Delta^2$, thereby solving implicit equations of $\Delta^1$ and $\Delta^2$ for $P_{axis}$:

$$\Delta^1 : \vec{v}_{rot}^1 \cdot (P_{axis} - P_{sensor}^1) = 0$$

$$\Delta^2 : \vec{v}_{rot}^2 \cdot (P_{axis} - P_{sensor}^2) = 0 \quad (8)$$

Equivalently solving for three coordinates $P_{axis\_x}$, $P_{axis\_y}$, and $P_{axis\_z}$:

$$\begin{cases} v_{rot\_x}^1 P_{axis\_x}^1 + v_{rot\_y}^1 P_{axis\_y}^1 + v_{rot\_z}^1 P_{axis\_z}^1 = d^1 \\ v_{rot\_x}^2 P_{axis\_x}^2 + v_{rot\_y}^2 P_{axis\_y}^2 + v_{rot\_z}^2 P_{axis\_z}^2 = d^2 \end{cases} \quad (9)$$

Where $d^1$ and $d^2$ are known constants given by:

$$\begin{cases} d^1 = v_{rot\_x}^1 P_{sensor\_x}^1 + v_{rot\_y}^1 P_{sensor\_y}^1 + v_{rot\_z}^1 P_{sensor\_z}^1 \\ d^2 = v_{rot\_x}^2 P_{sensor\_x}^2 + v_{rot\_y}^2 P_{sensor\_y}^2 + v_{rot\_z}^2 P_{sensor\_z}^2 \end{cases} \quad (10)$$

For a robust solution of Equation 9, a direct linear equation algorithm is used. First a largest absolute coordinate value, noted $\delta$, of $\vec{u}_{axis}$ given by equation 7, is selected by:

$$\delta = \max\{\text{absolute}(u_{axis\_x}, u_{axis\_y}, u_{axis\_z})\} \quad (11)$$

Depending of the value of $\delta$ from equation 11, the corresponding coordinate of $P_{axis}$ is set to zero. Solving for the two other coordinates, the equation 9 gives the general solution for $P_{axis}$ expressed as:

$$P_{axis} = \quad (12)$$

$$\begin{cases} \dfrac{(0, d^2 \cdot v_{rot\_z}^1 - d^1 \cdot v_{rot\_z}^2, d^1 \cdot v_{rot\_y}^2 - d^2 \cdot v_{rot\_y}^1)}{v_{rot\_y}^1 \cdot v_{rot\_z}^2 - v_{rot\_z}^1 \cdot v_{rot\_y}^2}; & \text{if } \delta = \text{abs}(u_{axis\_x}) \\ \dfrac{(d^2 \cdot v_{rot\_z}^1 - d^1 \cdot v_{rot\_z}^2, 0, d^1 \cdot v_{rot\_x}^2 - d^2 \cdot v_{rot\_x}^1)}{v_{rot\_x}^1 \cdot v_{rot\_z}^2 - v_{rot\_z}^1 \cdot v_{rot\_x}^2}; & \text{if } \delta = \text{abs}(u_{axis\_y}) \\ \dfrac{(d^2 \cdot v_{rot\_y}^1 - d^1 \cdot v_{rot\_y}^2, d^1 \cdot v_{rot\_x}^2 - d^2 \cdot v_{rot\_x}^1, 0)}{v_{rot\_x}^1 \cdot v_{rot\_y}^2 - v_{rot\_y}^1 \cdot v_{rot\_x}^2}; & \text{if } \delta = \text{abs}(u_{axis\_z}) \end{cases}$$

Figure 5:
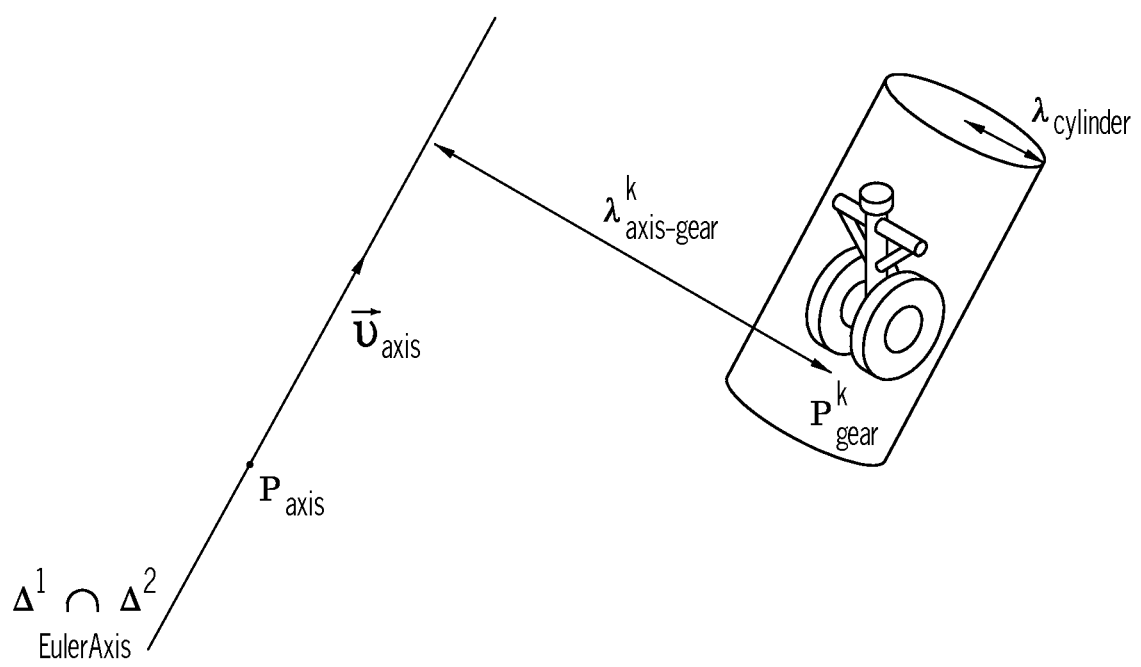
FIG. 5 illustrates an exemplary diagram of a Euler Axis and a landing assembly.

In block 306, the axis-distances routine receives gear coordinates 305 that include locations of the gears $P^k_{gear}$ 101, 103, 105 (of FIG. 1), and using equations 13 and 14, computes and outputs $\lambda^k_{axis-gear}$ and $\lambda_{cg}$ parameters defined as the distances from the estimated instant axis of rotation to the extended landing gears end points and the aircraft center of gravity as illustrated in FIG. 5.

$$\lambda_{axis-gear}^k = |(P_{gear}^k - P_{axis}) \times \vec{u}_{axis}|; K=1,2,3 \quad (13)$$

$$\lambda_{cg} = |P_{axis} \times \vec{u}_{axis}| \quad (14)$$

In block 308, the detection logic determines if the distance from the axis of rotation to a given gear is the minimum of the axis-distances values and is less than a gear-axis-distance threshold value defined as a gear-cylinder-diameter $\lambda_{cylinder}$ 307 and the distance from the axis of rotation to center of gravity of the aircraft exceeds the gear-axis-distance threshold value then the detection logic identifies the landing gear as center-of-rotation. The detection logic outputs a weight on wheel (force on wheel) signal 310 indicating contact:

$$WoW = K \text{ if } \begin{cases} \min_k(\lambda_{axis-gear}^k) < \lambda_{cylinder} \\ \& \\ \lambda_{cg} > \lambda_{cylinder} \end{cases} \quad (15)$$

With: WOW=1→left gear; WOW=2→right gear; WOW=3→foward gear.

The gear WoW signal 310 in FIG. 3 indicates that a weight on wheel has occurred on the gear. The indication provides information to the aircraft 100 operator and/or automatic control systems of the aircraft 100 that assists in operating the aircraft. Particularly, the weight on wheel signal may indicate that the aircraft has landed or has taken off from a landing area.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A method for sensing a force applied to an aircraft, the method comprising:
defining, at a processor, a first velocity vector as a function of a first velocity due to a rotation motion of the aircraft;
defining, at the processor, a second velocity vector as a function of a second velocity due to the rotation motion of the aircraft;
defining, at the processor, an instant axis of rotation of the aircraft as a function of the first velocity vector and the second velocity vector;
determining, at the processor, whether a force has been exerted on a first portion of the aircraft; and
outputting an indication that a force has been exerted on the first portion of the aircraft responsive to determining that the force has been exerted on the first portion of the aircraft;
wherein the defining the instant axis of rotation includes defining the instant axis of rotation as a line of intersection between a first plane perpendicular to the first velocity vector and a second plane perpendicular to the second velocity vector, wherein the first plane is not parallel to the second plane.

2. The method of claim 1, wherein the method further includes determining whether a rate of change of orientation of the aircraft satisfies a minimum rotation norm prior to defining the first and second velocity vectors.

3. The method of claim 2, wherein the method further includes determining whether a norm of an acceleration due to the rotation motion of the aircraft is greater than a minimum acceleration norm threshold value responsive to determining whether the rate of change of orientation of the aircraft satisfies the minimum rotation norm.

4. The method of claim 1, wherein the method further includes receiving a first signal from a first sensor indicative of a velocity of the aircraft, an acceleration of the aircraft, and a rate of change of orientation of the aircraft.

5. The method of claim 1, wherein the first velocity vector is associated with a first sensor, and the second velocity vector is associated with a second sensor.

6. The method of claim 5, wherein the instant axis of rotation of the aircraft is further defined as a function of a position of the first sensor and a position of the second sensor.

7. The method of claim 1, wherein the first portion of the aircraft includes a landing gear assembly.

8. A method for sensing a force applied to an aircraft, the method comprising:
defining, at a processor, a first velocity vector as a function of a first velocity due to a rotation motion of the aircraft;
defining, at the processor, a second velocity vector as a function of a second velocity due to the rotation motion of the aircraft;
defining, at the processor, an instant axis of rotation of the aircraft as a function of the first velocity vector and the second velocity vector;
determining, at the processor, whether a force has been exerted on a first portion of the aircraft; and
outputting an indication that a force has been exerted on the first portion of the aircraft responsive to determining that the force has been exerted on the first portion of the aircraft;
wherein the determining whether a force has been exerted on a portion of the aircraft includes:
calculating a distance between the first portion of the aircraft and the instant axis of rotation;
calculating a distance between a center of gravity of the aircraft and the instant axis of rotation;
determining whether the distance between the first portion of the aircraft and the instant axis of rotation is a minimum of an set of axis of rotation distance values, and whether the distance between the portion of the aircraft and the instant axis of rotation is less than a gear-axis-distance threshold value; and
determining whether the distance between a center of gravity of the aircraft and the instant axis of rotation exceeds the gear-axis-distance threshold value.

9. A system for sensing a force applied to an aircraft comprising:
a first sensor;
a second sensor; and
a processor operative to define a first velocity vector as a function of a first velocity due to a rotation motion of the aircraft, define a second velocity vector as a function of a second velocity due to the rotation motion of the aircraft, define an instant axis of rotation of the aircraft as a function of the first velocity vector and the second velocity vector, determine whether a force has been exerted on a first portion of the aircraft, and output an indication that a force has been exerted on the first portion of the aircraft responsive to determining that the force has been exerted on the first portion of the aircraft;
wherein the defining the instant axis of rotation includes defining the instant axis of rotation as a line of intersection between a first plane perpendicular to the first velocity vector and a second plane perpendicular to the second velocity vector, wherein the first plane is not parallel to the second plane.

10. The system of claim 9, wherein the processor is further operative to determine whether a rate of change of orientation of the aircraft satisfies a minimum rotation norm prior to defining the first and second velocity vectors.

11. The system of claim 10, wherein the processor is further operative to determine whether a norm of an acceleration due to the rotation motion of the aircraft is greater than a minimum acceleration norm threshold value responsive to determining whether the rate of change of orientation of the aircraft satisfies the minimum rotation norm.

12. The system of claim 9, wherein the processor is further operative to receive a first signal from the first sensor indicative of a velocity of the aircraft, an acceleration of the aircraft, and a rate of change of orientation of the aircraft.

13. The system of claim 9, wherein the first velocity vector is associated with a first sensor, and the second velocity vector is associated with a second sensor.

14. The system of claim 13, wherein the instant axis of rotation of the aircraft is further defined as a function of a position of the first sensor and a position of the second sensor.

15. The system of claim 9, wherein the first portion of the aircraft includes a landing gear assembly.

16. A system for sensing a force applied to an aircraft comprising:
a first sensor;
a second sensor; and
a processor operative to define a first velocity vector as a function of a first velocity due to a rotation motion of the aircraft, define a second velocity vector as a function of a second velocity due to the rotation motion of the aircraft, define an instant axis of rotation of the aircraft as a function of the first velocity vector and the second velocity vector, determine whether a force has been exerted on a first portion of the aircraft, and output an indication that a force has been exerted on the first portion of the aircraft responsive to determining that the force has been exerted on the first portion of the aircraft;

wherein the determining whether a force has been exerted on a portion of the aircraft includes:

calculating a distance between the first portion of the aircraft and the instant axis of rotation;

calculating a distance between a center of gravity of the aircraft and the instant axis of rotation;

determining whether the distance between the first portion of the aircraft and the instant axis of rotation is a minimum of a set of axis of rotation distance values, and whether the distance between the portion of the aircraft and the instant axis of rotation is less than a gear-axis-distance threshold value; and determining whether the distance between a center of gravity of the aircraft and the instant axis of rotation exceeds the gear-axis-distance threshold value.

* * * * *